United States Patent
Brousek et al.

(10) Patent No.: US 7,508,770 B2
(45) Date of Patent: Mar. 24, 2009

(54) METHOD FOR THE PROJECT ENGINEERING OF AN AUTOMATION SYSTEM

(75) Inventors: Norbert Brousek, Fürth (DE); Stefan Dausend, Schwabach (DE); Bernhard Weissbach, Frankenberg (DE)

(73) Assignee: Siemens Aktiengesellschaft, Munich (DE)

( * ) Notice: Subject to any disclaimer, the term of this patent is extended or adjusted under 35 U.S.C. 154(b) by 839 days.

(21) Appl. No.: 10/845,355

(22) Filed: May 13, 2004

(65) Prior Publication Data
US 2004/0237065 A1 Nov. 25, 2004

(30) Foreign Application Priority Data
May 19, 2003 (DE) ............................... 103 22 837

(51) Int. Cl.
*H04J 1/16* (2006.01)
*H04L 12/56* (2006.01)

(52) U.S. Cl. ........................................ 370/252; 370/386

(58) Field of Classification Search ......... 370/250–254, 370/386; 705/35, 14; 717/105; 716/18; 700/122
See application file for complete search history.

(56) References Cited

U.S. PATENT DOCUMENTS 5,801,958 A * 9/1998 Dangelo et al. ............... 716/18
6,519,571 B1 * 2/2003 Guheen et al. ................ 705/14
7,124,101 B1 * 10/2006 Mikurak ...................... 705/35
7,222,147 B1 * 5/2007 Black et al. .................. 709/200
2004/0024483 A1 * 2/2004 Holcombe ................... 700/122
2005/0177816 A1 * 8/2005 Kudukoli et al. ............ 717/105

FOREIGN PATENT DOCUMENTS

EP 1 274 291 A2 1/2003

OTHER PUBLICATIONS

Walter, "Einführung in den Simatic-Manger", May 2003, pp. 1-13, XP002408965, Retrieved from internet Jan. 12, 2007, www.energietechnik.fh-dortmund.de/personen/spszentr/Internet_Based_Learning/Hardwarekonfiguration.htm.

* cited by examiner

*Primary Examiner*—John Pezzlo

(57) ABSTRACT

A method for the project engineering of an automation system is provided. An existing project is opened or a new project is created in a project engineering software tool. In this project, a station having a plurality of slots is opened or generated. A hardware catalog is opened, the hardware catalog including a plurality of hardware modules. At least one hardware module is inserted from the hardware catalog into the station. The station is saved together with the inserted modules. In the process one or more hardware modules can be combined to form a hardware packet. In order to insert the hardware modules which are combined in a hardware packet, the hardware packet is selected and, as soon as the hardware packet is integrated into the station, all the hardware modules contained therein are automatically allocated to free slots of the station.

7 Claims, 2 Drawing Sheets

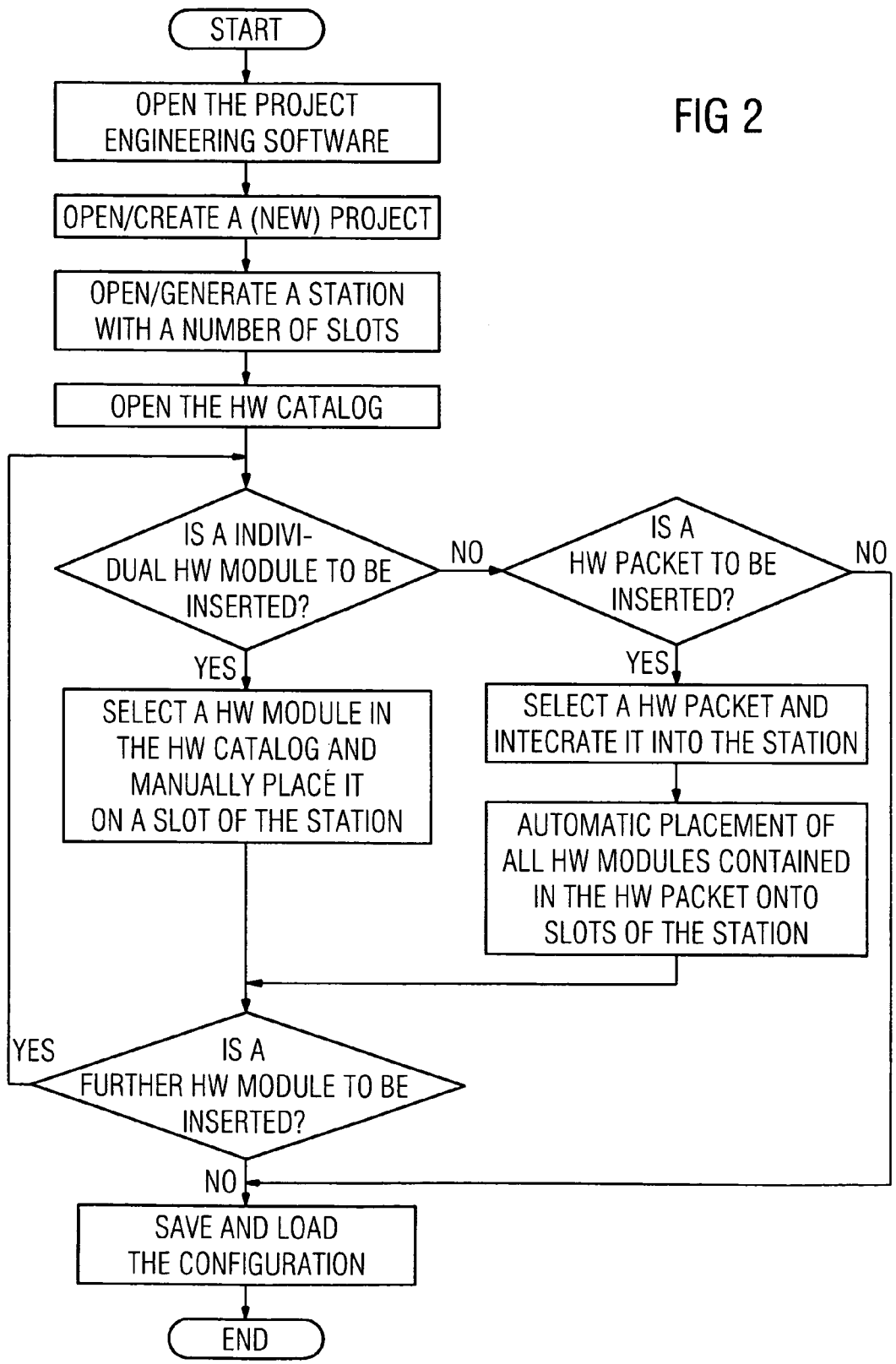

METHOD FOR THE PROJECT ENGINEERING OF AN AUTOMATION SYSTEM

CROSS REFERENCE TO RELATED APPLICATIONS

This application claims priority of German application No. 10322837.3 filed May 19, 2003 and which is incorporated by reference herein in its entirety.

FIELD OF INVENTION

The present invention relates to a method for the project engineering of an automation system. In particular the invention relates to a method for configuring hardware modules in an automation system. The invention further relates to a computer program product for implementing the method.

BACKGROUND OF INVENTION

Automation systems comprise one or more interconnected stations. Each of these stations is, in its turn, of modular design and can be assembled from different hardware (HW) modules. Said HW modules generally form the smallest unit of the [automation system—lacuna] and to facilitate the configuration process for the customer are compiled in a HW module catalog. In this catalog an order number is assigned to each HW module. This enables a customer to order an automation system, that is to say a machine, by specifying the corresponding order numbers in an order submitted to the manufacturer. Ideally the customer orders the desired functions of the machine, wherefrom the order is then generated automatically together with the order numbers. The machine then still has to be project engineered, that is to say configured and parameterized. This can be accomplished by means of project engineering software such as, for example, STEP7 from Siemens. This means that a corresponding user interface opens after the project engineering software has been invoked. A project is then created for the machine or for each station individually. In said project, the HW modules are then configured, that is to say, a slot in the station is assigned to each of the ordered and supplied hardware modules and parameterized accordingly. On completion, this configuration is then saved and loaded into the automation system. This project engineering process is generally very complicated and time-consuming, since it is done at the level of the smallest units, i.e. the HW modules; in other words a plurality of individual steps must be completed during the project engineering phase in order to configure all the HW modules.

SUMMARY OF INVENTION

The object of the present invention is therefore to provide a method which simplifies the project engineering of an automation system for the customer.

The object is achieved by a method for configuring an automation system according to claim 1. Said object is further achieved by a computer program product according to claim 2.

The method according to the invention permits less complex and time-intensive, and therefore faster, project engineering of the automation system in that hardware modules are grouped by the user into sets referred to as hardware packets.

The method described in the following for creating user-specific HW packets and the method for their integration according to the invention can advantageously be performed during the configuration/project engineering phase by means of corresponding computer program products.

BRIEF DESCRIPTION OF THE DRAWINGS

Further advantages of the present invention will emerge from the following description of the figures, in which:

FIG. 2 shows a flow chart depicting the project engineering process taking into account the created HW packets.

DETAILED DESCRIPTION OF INVENTION

Figure 1:
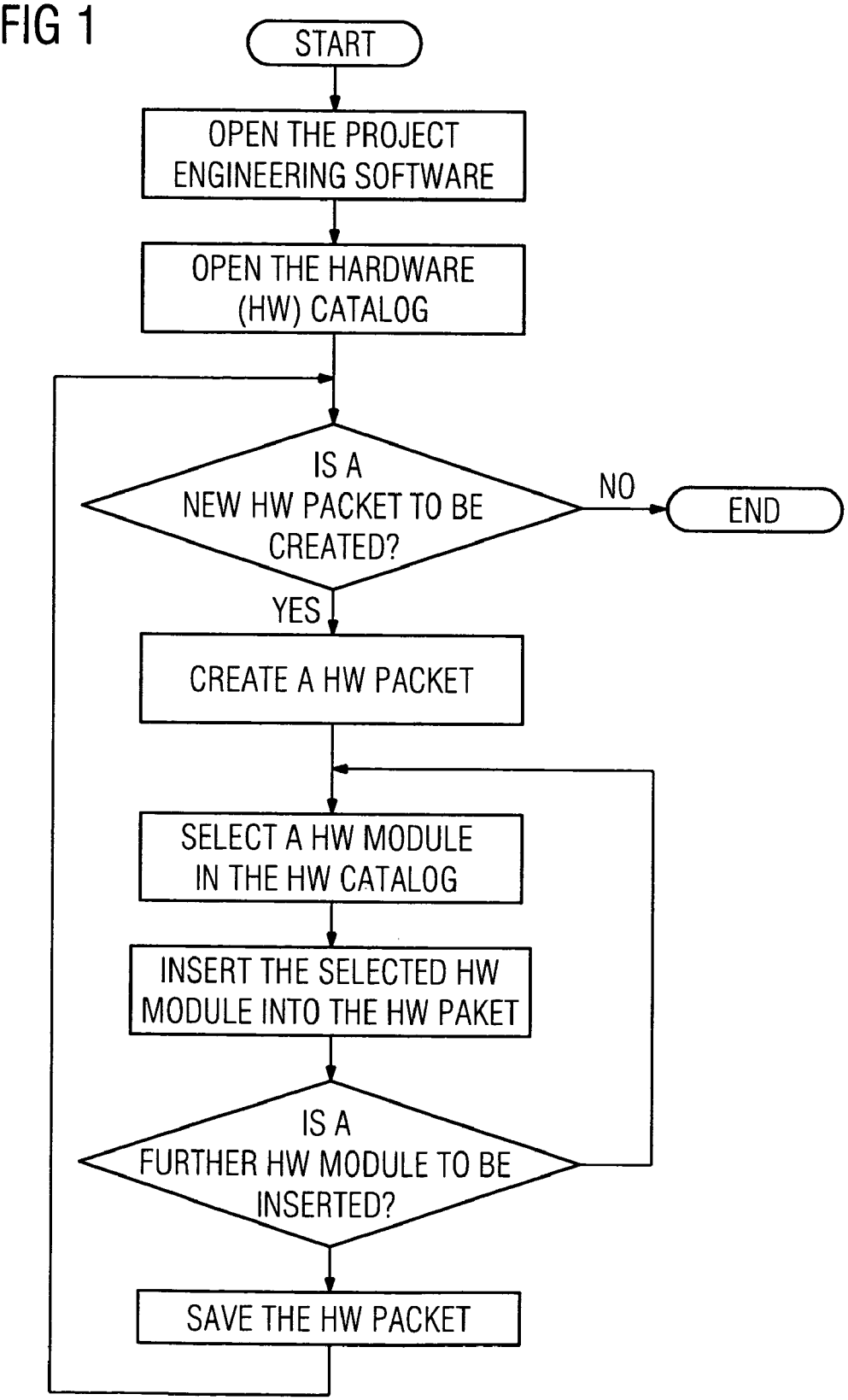
FIG. 1 shows a flow chart of the steps in creating a HW packet.

In currently known automation systems the HW modules have to be configured individually with the support of project engineering software. In large automation systems in particular, however, the machine to be project engineered usually consists of a plurality of stations. Each of the stations is in turn built up from a plurality of HW modules, with each HW module being connected to a slot of a bus system of the station. In large automation systems in particular, however, the project engineering overhead is consequently very high, since in this case each of the HW modules has to be configured individually in the project engineering software.

In order to avoid this time and effort, the two solutions described in the following are, in principle, already possible at the present time. On the one hand the project engineering software is used to create in advance one or more subproject files to which different HW modules are assigned. In the project engineering of a new machine, one or more of these subprojects are then copied into the project which is now to be created. Alternatively it is also possible to save the maximum configuration, in other words all permitted HW modules of a station, in a subproject in advance and then copy parts therefrom into the actual project. This solution has the advantage that it can in principle already be implemented today using the available project engineering software and so allows a more rapid project engineering process. It does, however, have the disadvantage that the preliminary creation overhead is very high. Moreover, it may be necessary to adapt the addresses for the HW modules manually during the project engineering of the new station.

The other solution which can be implemented today is represented by the catalog profiles themselves, which a user can create with the aid of the project engineering software. In other words, in addition to the HW catalog predefined by the manufacturer, it is also permitted for a user to independently produce customized HW catalogs. During the project engineering phase, HW modules can then be selected accordingly from the manufacturer HW catalog and/or from one of the custom-built catalog profiles and integrated into the station. Since the individually created HW catalogs only contain the HW modules defined by the user, the project engineering process is in fact completed more rapidly because the user will find the HW modules more quickly in his self-generated catalog profiles. However, there is still the disadvantage that the HW modules have to be individually selected, that is to say also selected from different profiles if necessary, and integrated into the station.

The automation system can, however, be configured and parameterized more easily and therefore more flexibly by means of the hardware (HW) packets according to the invention. In this case the HW packets are to be constructed in such a way that they comprise an arbitrary, user-definable number of HW modules. The method for creating HW packets of this kind will now be described in more detail with reference to the flow chart shown in FIG. 1. At the start, a project engineering software solution, such as is already known today for example in the form of STEP7 from Siemens, is opened. The user then has the opportunity, using a graphical access means (user interface), to configure, parameterize and program the station that is to be project engineered. In a further step the user then opens the HW catalog containing all the HW modules. If a new HW packet is now to be created, a suitable file, for example, has to be created and a corresponding window opened on the interface. A HW module is then selected in the HW catalog window, for example by clicking on the corresponding HW module icons, and then inserted into the HW packet. Further HW modules are inserted in a similar manner. Advantageously, a plurality of HW modules can also be selected at the same time in the HW catalog window and inserted in the HW packet window. Finally, the HW packet, that is to say the HW modules individually put together by the user in this HW packet, still has to be saved.

Advantageously, the user should be able to store this and the other HW packets individually created by him as files in a freely selectable directory. This enables a user to put together his own catalog from HW packets. This can then be saved for example to a data medium (such as CD-ROM) or to a network server. This gives the user the capability to invoke these individually created HW packets from within different projects and deploy them during the project engineering phase. If the HW packets are stored as files, it is advantageous if the file names can be freely assigned by the user. It is also conceivable to store the HW packets produced in accordance with the described method as macros. It is also advantageous to integrate the HW packets into the HW catalog profile so that a user has the option of selecting a suitable HW packet directly from the HW catalog. It therefore makes sense to transfer the current HW catalog known from STEP7 and store the HW packets under this. Although the method described with reference to FIG. 1 is described only in relation to the creation of a new project it can also be used for the subsequent processing of already created HW packets. Thus, HW modules can be added or also deleted accordingly.

The method for configuring an automation system according to the invention will now be described in more detail with reference to the flow chart shown in FIG. 2.

For the configuration phase, too, after the start it is first of all necessary to open the project engineering software, for example STEP7 from Siemens. In the interface which then appears, either an already existing project can then be opened or a new project can be created. Within the project, a station must then be created or an already existing station opened. The opened station is then displayed in the interface in a separate window, such as those known for example from Windows interfaces. In addition, the slots available for this station are displayed in the window. The form and content of the window will not be dealt with further in this context. Windows of this type are doubtless known to a person skilled in the art from, for example, the SIMATIC Manager in the STEP7 project engineering software from SIEMENS. In order that the project can be configured with HW modules, the HW catalog now still has to be opened. Generally this is normally a HW catalog profile from a manufacturer such as Siemens, in which at least all the HW modules available from the manufacturer can be found. This HW catalog is also displayed in a corresponding window of the user interface and is most likely familiar. If an individual HW module is now to be inserted into a slot in the station, the corresponding HW module must be selected in the HW catalog and subsequently placed manually by the user on a slot of the station. This can be accomplished for example in that the user clicks on the corresponding HW module in the HW catalog window with a mouse pointer and drags it onto a free slot in the station window. Certain rules must be observed when placing HW modules onto slots of the station, but these will not be discussed any further at this point since they too are clear to a person skilled in the art from existing systems and their project engineering. Further HW modules are added to the station in a similar way to that described previously. If an entire HW packet rather than an individual module is now to be inserted, then the user must open a corresponding HW packet. As already described in connection with FIG. 1, a HW packet of this kind, which has of course been assembled individually by a user from one or more HW modules, can be present for example as a file, as a macro or also as a subset in the HW catalog itself. Thus, a HW packet can be selected from the HW catalog, for example by clicking on it with a mouse pointer, and dragged into the station window. As soon as the HW packet has been dragged into the station window, all the HW modules stored in the HW packet are allocated to free slots of the station. In other words, by one-time selection of a HW packet the user is able to insert a whole group of HW modules at the same time into slots in the station window. This capability is especially advantageous when a user uses the same HW modules on a recurring basis, that is to say in many projects. The user can then create a HW packet from these modules and save it according to the method shown in FIG. 1. At a later time he can then use this HW packet in the method for configuring HW modules shown in FIG. 2 in order to integrate and project engineer these HW modules with maximum efficiency and therefore very rapidly. If further HW packets or HW modules are to be inserted, the previously described steps are to be repeated accordingly. If, on the other hand, no further HW modules are to be inserted, then the configuration should be saved and loaded into the automation system. At the latest at the time of saving, in other words before the configuration is loaded into the automation system, various validity checks must be carried out. This can be, for instance, a check to verify whether the requisite slot rules have been complied with or whether the number of available slots is sufficient to allow insertion of the HW modules. However, said validity checks will not be explored further at this juncture, since they correspond to those in currently known systems.

The aim of the invention described in the foregoing largely with reference to the STEP7 project engineering software from Siemens is to provide the user who is tasked with project engineering the automation system with a method with which he can configure and parameterize an installation with a minimum of effort and therefore in a short time. Owing to the fact that frequently used HW modules can be combined in a HW packet created by the user and that this packet automatically splits up again into the individual HW modules when it is integrated into a station, it is possible, at a stroke, to place a number of HW modules in a station simultaneously. By creating different HW packets of this type, a user can compile his own customized catalog with corresponding groups of HW modules. Even though the invention has been described mainly in connection with STEP7, it is not restricted to this project engineering software. Rather, it can be usefully applied wherever the intention is to simplify the processes involved in project engineering, i.e. configuring and parameterizing, an automation system for a user. Thus, the method can be used accordingly, for example in the project engineering of entire automation systems comprising a large number of individual stations.

The invention claimed is:

1. A method for configuring hardware modules in an automation system, comprising:
   opening an existing project or creating a new project in a project engineering software tool;
   opening or generating, in this project, a station having a plurality of slots;
   opening a hardware catalog comprising a plurality of hardware modules;
   inserting at least one hardware module from the hardware catalog into the station;
   saving the station together with the inserted hardware modules on a memory; and
   using the configuration saved in memory to configure the automation system.

2. A method according to claim 1, further comprising: automatically allocating the hardware modules to free slots of the station.

3. A method according to claim 1, wherein one or more hardware modules can be combined to form a hardware packet, wherein in order to insert the hardware modules which are combined in a hardware packet, the hardware packet must first be selected and, as soon as the hardware packet is integrated into the station, all the hardware modules contained therein are automatically allocated to free slots of the station.

4. A computer readable medium encoded with a computer program comprising instructions being executed by a computer for implementing a method for configuring hardware modules in an automation system, the method comprising:
   opening an existing project or creating a new project in a project engineering software tool;
   opening or generating, in this project, a station having a plurality of slots;
   opening a hardware catalog comprising a plurality of hardware modules;
   inserting at least one hardware module from the hardware catalog into the station;
   saving the station together with the inserted hardware modules; and
   using the configuration saved in memory to configure the automation system.

5. A method for packaging hardware modules to a hardware packet in an automation system, comprising:
   opening an existing project or creating a new project in a project engineering software tool;
   opening or generating, in this project, a station having a plurality of slots;
   opening a hardware catalog comprising a plurality of hardware modules;
   inserting at least one hardware module from the hardware catalog into the station;
   saving the station together with the inserted hardware modules on a memory, wherein one or more hardware modules are combined to form a hardware packet; and
   providing the saved information to configure hardware in the automation system.

6. A method according to claim 5, wherein in order to insert the hardware modules which are combined in a hardware packet, the hardware packet must first be selected.

7. A method according to claim 6, wherein as soon as the hardware packet is integrated into the station, all the hardware modules contained therein are automatically allocated to free slots of the station.

* * * * *